US000001105H

United States Statutory Invention Registration [19]

[11] Reg. Number: H1105

Jebo et al.

[43] Published: Sep. 1, 1992

[54] ASYMMETRICAL RADIOGRAPHIC ELEMENTS, ASSEMBLIES AND PACKAGES

[75] Inventors: Richard J. Jebo, Rochester; Paul W. Twombly, Webster; Robert E. Dickerson, Rochester; Phillip C. Bunch, Brighton, all of N.Y.

[73] Assignee: Eastman Kodak Company, Rochester, N.Y.

[21] Appl. No.: 502,341

[22] Filed: Mar. 29, 1990

[51] Int. Cl.[5] ..... G03C 1/46

[52] U.S. Cl. ..... 430/502; 430/139; 430/509; 430/966

[58] Field of Search ..... 430/139, 502, 509, 966

[56] References Cited

U.S. PATENT DOCUMENTS

| | | | |
|---|---|---|---|
| 3,466,440 | 9/1969 | Tone et al. | 250/67 |
| 3,488,753 | 6/1970 | Tone et al. | 250/67 |
| 3,504,180 | 3/1970 | Tone et al. | 250/68 |
| 3,958,125 | 5/1976 | Zechmair et al. | 250/480 |
| 4,081,686 | 3/1978 | Nieuweboer | 250/480 |
| 4,339,038 | 7/1982 | Bauer | 206/455 |
| 4,350,248 | 9/1982 | Bauer | 206/455 |
| 4,425,425 | 1/1984 | Abbott et al. | 430/502 |
| 4,425,426 | 1/1984 | Abbott et al. | 430/502 |
| 4,513,078 | 4/1985 | Sandrik et al. | 430/496 |
| 4,526,862 | 7/1985 | Pele | 430/496 |
| 4,603,428 | 7/1986 | Sandrik et al. | 430/496 |
| 4,707,435 | 11/1987 | Lyons et al. | 430/494 |
| 4,710,637 | 12/1987 | Luckey et al. | 250/486.1 |
| 4,803,150 | 2/1989 | Dickerson et al. | 430/502 |
| 4,900,652 | 2/1990 | Dickerson et al. | 430/502 |

*Primary Examiner*—Robert L. Stoll
*Assistant Examiner*—Joseph D. Anthony
*Attorney, Agent, or Firm*—Carl O. Thomas

[57] ABSTRACT

An asymmetric radiographic element is disclosed comprised of a transparent film support, silver halide emulsion layer units of differing sensitometric characteristics coated on opposite sides of the film support, and a processing solution decolorizable means for reducing crossover to less than 10 percent. The radiographic element is positioned between intensifying screens and mounted in a cassette for exposure to X-radiation. A feature is included for ascertaining which of the emulsion layer units is positioned nearest a source of X-radiation during exposure.

31 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ASYMMETRICAL RADIOGRAPHIC ELEMENTS, ASSEMBLIES AND PACKAGES

FIELD OF THE INVENTION

The invention relates to low crossover double coated radiographic elements, alone and in combination with intensifying screens and exposure cassettes.

BACKGROUND

In medical radiography an image of a patient's tissue and bone structure is produced by exposing the patient to X-radiation and recording the pattern of penetrating X-radiation using a radiographic element containing at least one radiation-sensitive silver halide emulsion layer coated on a transparent (usually blue tinted) film support. The X-radiation can be directly recorded by the emulsion layer where only limited areas of exposure are required, as in dental imaging and the imaging of body extremities. However, a more efficient approach, which greatly reduces X-radiation exposures, is to employ an intensifying screen in combination with the radiographic element. The intensifying screen absorbs X-radiation and emits longer wavelength electromagnetic radiation which silver halide emulsions more readily absorb. Another technique for reducing patient exposure is to coat two silver halide emulsion layers on opposite sides of the film support to form a "double coated" radiographic element.

Diagnostic needs can be satisfied at the lowest patient X-radiation exposure levels by employing a double coated radiographic element in combination with a pair of intensifying screens. The silver halide emulsion layer unit on each side of the support directly absorbs about 1 to 2 percent of incident X-radiation. The front screen, the screen nearest the X-radiation source, absorbs a much higher percentage of X-radiation, but still transmits sufficient X-radiation to expose the back screen, the screen farthest from the X-radiation source. In the overwhelming majority of applications the front and back screens are balanced so that each absorbs about the same proportion of the total X-radiation. However, a few variations have been reported from time to time. A specific example of balancing front and back screens to maximize image sharpness is provided by Luckey et al. U.S. Pat. No. 4,710,637. Lyons et al. U.S. Pat. No. 4,707,435 discloses in Example 10 the combination of two proprietary screens, Trimax 2 TM employed as a front screen and Trimax 12F TM employed as a back screen. K. Rossman and G. Sanderson, "Validity of the Modulation Transfer Function of Radiographic Screen-Film Systems Measured by the Slit Method", Phys. Med. Biol., 1968, vol. 13, no. 2, pp. 259–268, report the use of unsymmetrical screen-film assemblies in which either the two screens had measurably different optical characteristics or the two emulsions had measurably different optical properties.

An imagewise exposed double coated radiographic element contains a latent image in each of the two silver halide emulsion units on opposite sides of the film support. Processing converts the latent images to silver images and concurrently fixes out undeveloped silver halide, rendering the film light insensitive. When the film is mounted on a view box, the two superimposed silver images on opposite sides of the support are seen as a single image against a white, illuminated background.

It has been a continuing objective of medical radiography to maximize the information content of the diagnostic image while minimizing patient exposure to X-radiation. In 1918 the Eastman Kodak Company introduced the first medical radiographic product that was double coated, and the Patterson Screen Company that same year introduced a matched intensifying screen pair for that product.

An art recognized difficulty with employing double coated radiographic elements in combination with intensifying screens as described above is that some light emitted by each screen passes through the transparent film support to expose the silver halide emulsion layer unit on the opposite side of the support to light. The light emitted by a screen that exposes the emulsion layer unit on the opposite side of the support reduces image sharpness. The effect is referred to in the art as crossover.

A variety of approaches have been suggested to reduce crossover, as illustrated by *Research Disclosure,* Vol. 184, August 1979, Item 18431, Section V. Cross-Over Exposure Control. *Research Disclosure* is published by Kenneth Mason Publications, Ltd., Dudley Annex, 21a North Street, Emsworth, Hampshire P010 7DQ, England. While some of these approaches are capable of entirely eliminating crossover, they either interfere with (typically entirely prevent) concurrent viewing of the superimposed silver images on opposite sides of the support as a single image, require separation and tedious manual reregistration of the silver images in the course of eliminating the crossover reduction medium, or significantly desensitize the silver halide emulsion. As a result, none of these crossover reduction approaches have come into common usage in the radiographic art. An example of a recent crossover cure teaching of this type is Bollen et al European published patent application 0,276,497, which interposes a reflective support between the emulsion layer units during imaging.

The most successful approach to crossover reduction yet realized by the art consistent with viewing the superimposed silver images through a transparent film support without manual registration of images has been to employ double coated radiographic elements containing spectrally sensitized high aspect ratio tabular grain emulsions or thin intermediate aspect ratio tabular grain emulsions, illustrated by Abbott et al. U.S. Pat. Nos. 4,425,425 and 4,425,426, respectively. Whereas radiographic elements typically exhibited crossover levels of at least 25 percent prior to Abbott et al, Abbott et al provide examples of crossover reductions in the 15 to 22 percent range.

Still more recently Dickerson et al. U.S. Pat. No. 4,803,150 (hereinafter referred to as Dickerson et al. I) has demonstrated that by combining the teachings of Abbott et al. with a processing solution decolorizable microcrystalline dye located between at least one of the emulsion layer units and the transparent film support "zero" crossover levels can be realized. Since the technique used to determine crossover, single screen exposure of a double coated radiographic element, cannot distinguish between exposure of the emulsion layer unit on the side of the support remote from the screen caused by crossover and the exposure caused by direct absorption of X-radiation, "zero" crossover radiographic elements in reality embrace radiographic elements with a measured crossover (including direct X-ray absorption) of less than about 5 percent.

Dickerson et al. U.S. Pat. No. 4,900,652 (hereinafter referred to as Dickerson et al. II) adds to the teachings of Dickerson et al., cited above, specific selections of hydrophilic colloid coating coverages in the emulsion and dye containing layers to allow the "zero" crossover radiographic elements to emerge dry to the touch from a conventional rapid access processor in less than 90 seconds with the crossover reducing microcrystalline dye decolorized.

Although major improvements in radiographic elements have occurred over the years, some user inconveniences have been heretofore accepted as being inherent consequences of the complexities of medical diagnostic imaging. Medical diagnostic imaging places extreme and varying demands on radiographic elements. The extremities, lungs, heart, skull, sternum plexus, etc., exhibit widely differing X-ray absorption capabilities. Features to be identified can range from broken bones and tooth cavities to miniscule variations in soft tissue, typical of mammographic examinations, to examination of variations in dense tissue, such as the heart. In a typical chest X-ray the radiologist is confronted with attempting to pick up both lung and heart anomalies, even though the X-radiation absorption in the heart area is about 10 times greater than that of the lung area.

The best current solution to the diversity of demands of medical diagnostic imaging is to supply the radiologist with a variety of intensifying screens and radiographic elements each having their imaging speed, contrast, and sharpness tailored to satisfy a specific type or category of imaging. The radiologist must choose between high resolution, medium resolution, and general purpose screens for the most appropriate balance between speed (efficiency of X-radiation conversion to light) and image sharpness. The screens are combined with a variety of radiographic elements, differing in speed, sharpness, and contrast.

To hold a double coated radiographic element and a front and back pair of intensifying screens in position during X-ray exposure it is conventional practice to place the radiographic element and intensifying screen assembly in a mounting housing, commonly referred to as cassette. The following are illustrations of cassette constructions:

| | |
|---|---|
| Tone et al | U.S. Pat. No. 3,466,440 |
| Tone et al | U.S. Pat. No. 3,488,753 |
| Tone et al | U.S. Pat. No. 3,504,180 |
| Zechmair et al | U.S. Pat. No. 3,958,125 |
| Nieuweboer | U.S. Pat. No. 4,081,686 |
| Bauer | U.S. Pat. No. 4,339,038 |
| Bauer | U.S. Pat. No. 4,350,248 |

RELATED PATENT APPLICATIONS

Dickerson and Bunch U.S. Ser. No. 314,341, filed Feb. 23, 1989, now abandoned in favor of U.S. Ser. No. 385,114, filed Jul. 26, 1989, commonly assigned, now allowed, as U.S. Pat. No. 4,997,750 titled RADIOGRAPHIC ELEMENTS WITH SELECTED SPEED RELATIONSHIPS, discloses low crossover double coated radiographic elements in which the emulsion layer units on opposite sides of the support differ in speed.

Dickerson and Bunch U.S. Ser. No. 314,339, filed Feb. 23, 1989, now abandoned in favor of U.S. Ser. No. 385,128, filed Jul. 26, 1989, now abandoned of which U.S. Ser. No. 502,220, now allowed as U.S. Pat. No. 4,994,355, concurrently filed is a continuation-in-part, all commonly assigned, titled RADIOGRAPHIC ELEMENTS WITH SELECTED CONTRAST RELATIONSHIPS, discloses low crossover double coated radiographic elements in which the emulsion layer units on opposite sides of the support differ in contrast.

Dickerson and Bunch U.S. Ser. No. 502,153, concurrently filed and common assigned, titled MINIMAL CROSSOVER RADIOGRAPHIC ELEMENTS ADAPTED FOR VARIED INTENSIFYING SCREEN EXPOSURES, discloses low crossover double coated radiographic elements in which the emulsion layer units on opposite sides of the support differ in contrast in a manner particularly suited to permitting flexibility in the choice of intensifying screen pairs employed.

Bunch and Dickerson U.S. Ser. No. 314,023, filed Feb. 23, 1989, abandoned in favor of U.S. Ser. No. 373,720, filed Jun. 29, 1989, which was in turn abandoned in favor of U.S. Ser. No. 456,889, filed Dec. 26, 1989, commonly assigned, now allowed, as U.S. Pat. No. 5,021,327 titled RADIOGRAPHIC SCREEN/-FILM ASSEMBLIES WITH IMPROVED DETECTION QUANTUM EFFICIENCIES, discloses low crossover double coated radiographic elements in combination with a pair of intensifying screens, where the back emulsion layer unit-intensifying screen combination exhibits a photicity twice that of the front emulsion layer unit-intensifying screen combination, where photicity is the product of screen emission and emulsion layer unit sensitivity.

SUMMARY OF THE INVENTION

In one aspect this invention is directed to a radiographic element comprised of a transparent film support, first and second silver halide emulsion layer units coated on opposite sides of the film support, and means for reducing to less than 10 percent crossover of electromagnetic radiation of wavelengths longer than 300 nm capable of forming a latent image in the silver halide emulsion layer units, the crossover reducing means being decolorized in less than 90 seconds during processing of the emulsion layer units. The radiographic element is characterized in that the first and second silver halide emulsion layer units exhibit significantly different sensitometric characteristics and means are provided for ascertaining which of the first and second emulsion layer units are positioned nearest a source of X-radiation during exposure.

In another aspect, this invention is directed to an imaging assembly comprised of a radiographic element as described above and a front and back pair of intensifying screens.

In an additional aspect, this invention is directed to an exposure package comprised of an assembly as described above and means forming a cassette housing for the assembly.

DESCRIPTION OF PREFERRED EMBODIMENTS

Figure 1:
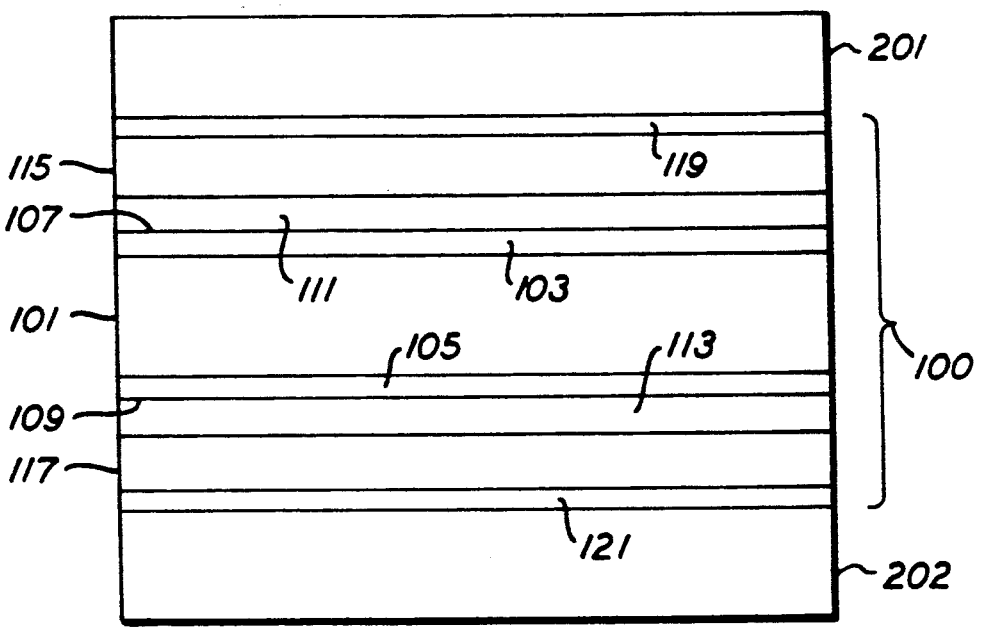
FIG. 1 is a schematic view of an assembly of a double coated radiographic element and a pair of intensifying screens.

The double coated radiographic elements of this invention offer the capability of producing superimposed silver images capable of transmission viewing which can satisfy the highest standards of the art in terms of speed and sharpness. At the same time the radiographic elements are more adaptable to meeting the varied imaging demands of medical diagnostic radiology and in specific applications are capable of producing superior imaging results. For example, the radiographic elements can be selected to produce a wide range of contrasts merely by altering the choice of intensifying screens employed in combination with the radiographic elements. Further, the radiographic elements can produce superior imaging detail over a wide range of exposure levels within a single image, such as is required for successfully capturing both heart and lung image detail within a single radiographic image.

The radiographic elements are constructed with a transparent film support and first and second emulsion layer units coated on opposite sides of the support. This allows transmission viewing of the silver images on opposite sides of the support after exposure and processing.

Between the emulsion layer units on opposite sides of the support, means are provided for reducing to less than 10 percent crossover of electromagnetic radiation of wavelengths longer than 300 nm capable of forming a latent image in the silver halide emulsion layer units. In addition to having the capability of absorbing longer wavelength radiation during imagewise exposure of the emulsion layer units the crossover reducing means must also have the capability of being decolorized in less than 90 seconds during processing, so that no visual hindrance is presented to viewing the superimposed silver images.

The crossover reducing means decreases crossover to less than 10 percent, preferably reduces crossover to less than 5 percent, and optimally less than 3 percent. However, it must be kept in mind that for crossover measurement convenience the crossover percent being referred to also includes "false crossover", apparent crossover that is actually the product of direct X-radiation absorption. That is, even when crossover of longer wavelength radiation is entirely eliminated, measured crossover will still be in the range of 1 to 2 percent, attributable to the X-radiation that is directly absorbed by the emulsion farthest from the intensifying screen. Crossover percentages are determined by the procedures set forth in Abbott et al. U.S. Pat. Nos. 4,425,425 and 4,425,426.

Once the exposure crossover between the emulsion layer units has been reduced to less than 10 percent (hereinafter referred to as low crossover) the exposure response of an emulsion layer unit on one side of the support is influenced to only a slight extent by (i.e., essentially independent of) the level of exposure of the emulsion layer on the opposite side of the support. It is therefore possible to form two independent imaging records, one emulsion layer unit recording only the emission of the front intensifying screen and the remaining emulsion layer unit recording only the emission of the back intensifying screen during imagewise exposure to X radiation.

Historically radiographic elements have been constructed to produce identical sensitometric records in the two emulsion layer units on the opposite sides of the support. The reason for this is that until practical low crossover radiographic elements were made available by Dickerson et al. I and II, cited above, both emulsion layer units of a double coated radiographic element received essentially similar exposures, since both emulsion layer units were simultaneously exposed by both the front and back intensifying screens. With the recent introduction of practical low crossover radiographic elements the practice of coating identical emulsion layer units on opposite sides of the support has continued.

The radiographic elements of this invention employ emulsion layer units on opposite sides of the transparent support that differ in their sensitometric properties. That is, not only are the radiographic records produced in each of the emulsion layer units independent of the other, but the emulsion layer units also are selected to having differing imaging properties. Stated another way, the radiographic elements are sensitometrically asymmetric. It is this feature that allows the radiographic elements of this invention to exhibit the greater adaptability and improvement of imaging properties noted above.

Customarily, sensitometric characterizations of double coated radiographic elements generate characteristic (density vs. log exposure) curves that are the sum of two identical emulsion layer units, one coated on each of the two sides of the transparent support. Therefore, to keep speed and other sensitometric measurements (minimum density, contrast, maximum density, etc.) as compatible with customary practices as possible, the speed and other sensitometric characteristics of the first silver halide emulsion layer unit are determined with the first silver halide emulsion unit replacing the second silver halide emulsion unit to provide an arrangement with the first silver halide emulsion unit present on both sides of the transparent support. The speed and other sensitometric characteristics of the second silver halide emulsion layer unit are similarly determined with the second silver halide emulsion unit replacing the first silver halide emulsion unit to provide an arrangement with the second silver halide emulsion unit present on both sides of the transparent support.

The sensitometric differences between the first and second emulsion layer units can be varied to achieve a wide variety of different imaging effects. The advantages can best be illustrated by considering first and second emulsion layer units on opposite sides of the support that differ in speed and/or contrast.

In one preferred form, the first silver halide emulsion layer unit exhibits a speed at 1.0 above minimum density which is at least twice that of the second silver halide emulsion layer unit. While the best choice of speed differences between the first and second emulsion layer units can differ widely, depending upon the contrast of each individual emulsion and the application to be served, in most instances the first emulsion layer unit will exhibit a speed that is from 2 to 10 times that of the second emulsion layer unit. In most applications optimum results are obtained when the first emulsion layer unit exhibits a speed that is from about 2 to 4 times that of the second emulsion layer unit. So long as the relative speed relationships are satisfied, the first and second emulsion units can cover the full range of useful radiographic imaging speeds. For purposes of ascertaining speed differences speed is measured at 1.0 above minimum density. It is recognized that this is an arbitrary selection point, chosen simply because it is typical of speed measurements in radiography. For nontypical characteristic curves (e.g., direct positive imaging or unusual curve shapes) another speed reference point can be selected.

The advantage gained by employing emulsion layer units differing in speed as noted above is that by employing differing intensifying screens with these radiographic elements a wide range of differing image contrasts can be obtained using a single type of radiographic element. It is, for example, possible to employ a single type of radiographic element according to this invention in combination with each of two pairs of intensifying screens in which the emission characteristics of the front and back screens differ (hereinafter referred to as an unsymmetrical screen pair). When one unsymmetrical screen pair has an emission pattern that is the reverse of another—i.e., the front and back screen emissions match the back and front screen emissions of the other pair, two different images differing in contrast are obtained. By using several different symmetrical or unsymmetrical pairs of intensifying screens a variety of image contrasts can be achieved with a single type of radiographic element according to this invention under identical X radiation exposure conditions. When conventional symmetrical low crossover double coated radiographic elements or high crossover radiographic elements, regardless of whether the emulsion layer units are the same or different, are substituted for the radiographic elements of this invention, reversing emission characteristics of unsymmetrical front and back screen pairs has little or no effect on image contrast. It is specifically contemplated to obtain two different images of differing contrast using only one type of sensitometrically asymmetric low crossover radiographic element according to the invention merely by reversing the orientation of the radiographic element between the intensifying screens.

In another preferred form of the invention the first and second emulsion layer units differ significantly in contrast. In one specifically preferred form, the first silver halide emulsion layer unit exhibits an average contrast of less than 2.0 while the second silver halide emulsion layer unit exhibits an average contrast of at least 2.5. It is preferred that the average contrasts of the first and second silver halide emulsion layer units differ by at least 1.0. While the best choice of average contrast differences between the first and second emulsion layer units can differ widely, depending upon the application to be served, in most instances the first and second emulsion layer units exhibit an average contrast difference in the range of from 0.5 to 2.0, optimally from 1.0 to 1.5, where a conventional, uniform intensity source of X-radiation is employed for exposure.

By employing advanced multiple-beam equalization radiography (AMBER) the average contrast differences between the first and second emulsion layer units can be increased, so that average contrast differences in the range of from 0.5 to 3.5, optimally from 1.0 to 2.5, can be employed. These wider ranges of average contrast differences are made possible because of the capability of the AMBER exposure system to sense and reduce exposure in areas of the radiographic element that would otherwise receive a maximum X-radiation exposure—e.g., lung areas. Thus the AMBER exposure system is, for example, capable of concurrently providing useful heart and lung area imaging detail even though the second emulsion layer unit exhibits higher contrast levels than would normally be used with conventional uniform X-radiation exposure systems employed for heart and lung area imaging. A description of the AMBER exposure system is provided by L. J. Schultze-Kool, D. L. T. Busscher, H. Vlasbloem, J. Hermans, P. C. v.d. Merwe, P. R. Algra and W. Herstel, "Advanced Multiple-Beam Equalization Radiography in Chest Radiology: A Stimulated Nodule Detection Study", Radiology, October 1988, pp. 35–39, here incorporated by reference.

As employed herein the term "average contrast" is employed to indicate a contrast determined by reference to an emulsion layer unit characteristic curve at a density of 0.25 above minimum density and at a density of 2.0 above minimum density. The average contrast is the density difference, 1.75, divided by the log of the difference in exposure levels at two density reference points on the characteristic curve, where the exposure levels are meter-candle-seconds. As in the case of the speed determinations above, the reference points for average contrast determinations have been arbitrarily selected from among typical reference points employed in radiography. For nontypical characteristic curves (e.g., direct positive imaging or unusual curve shapes) other reference densities can be selected.

It is possible to obtain better imaging detail in both high density (e.g., heart) and low density (e.g., lung) image areas when the contrasts of the first and second emulsion layer units differ as described above. It is, of course, possible to employ first and second emulsion layer units that differ in both speed and contrast.

Since the emulsion layer units of the radiographic element are sensitometrically different, producing a different radiographic image, depending upon which of the two unlike emulsion layer units is positioned nearest the source of X radiation during imagewise exposure, it is contemplated to incorporate means for ascertaining which of the emulsion layer units is positioned nearest the source of X radiation during exposure. When the front and back intensifying screens differ significantly in their emission characteristics, very large imaging differences are created by reversing the sensitometrically asymmetric radiographic elements of this invention in relation to the intensifying screens. It is therefore also contemplated to construct the screens with an orientation feature facilitating their proper orientation in an assembly consisting of the front and back screens separated by the radiographic element. It is additionally contemplated to construct the exposure package, consisting of the assembly and a cassette, to insure the intended orientation of elements during exposure to X radiation.

The structural features of the invention can best be appreciated by reference to illustrative preferred embodiments. Referring to FIG. 1, in the assembly shown a radiographic element 100 according to this invention is positioned between a pair of light emitting intensifying screens 201 and 202. The radiographic element support is comprised of a transparent radiographic support element 101, typically blue tinted, capable of transmitting light to which it is exposed and, optionally, similarly transmissive subbing units 103 and 105. On the first and second opposed major faces 107 and 109 of the support formed by the subbing units are crossover reducing hydrophilic colloid layers 111 and 113, respectively. Overlying the crossover reducing layers 111 and 113 are light recording latent image forming silver halide emulsion layer units 115 and 117, respectively. Each of the emulsion layer units is formed of one or more hydrophilic colloid layers including at least one silver halide emulsion layer. Overlying the emulsion layer units 115 and 117 are optional hydrophilic colloid protective overcoat layers 119 and 121, respectively. All of the hydrophilic colloid layers are permeable to processing solutions.

In use, the assembly is imagewise exposed to X radiation. The X radiation is principally absorbed by the intensifying screens 201 and 202, which promptly emit light as a direct function of X ray exposure. Considering first the light emitted by screen 201, the light recording latent image forming emulsion layer unit 115 is positioned adjacent this screen to receive the light which it emits. Because of the proximity of the screen 201 to the emulsion layer unit 115 only minimal light scattering occurs before latent image forming absorption occurs in this layer unit. Hence light emission from screen 201 forms a sharp image in emulsion layer unit 115.

However, not all of the light emitted by screen 201 is absorbed within emulsion layer unit 115. This remaining light, unless otherwise absorbed, will reach the remote emulsion layer unit 117, resulting in a highly unsharp image being formed in this remote emulsion layer unit. Both crossover reducing layers 111 and 113 are interposed between the screen 201 and the remote emulsion layer unit and are capable of intercepting and attenuating this remaining light. Both of these layers thereby contribute to reducing crossover exposure of emulsion layer unit 117 by the screen 201. In an exactly analogous manner the screen 202 produces a sharp image in emulsion layer unit 117, and the light absorbing layers 111 and 113 similarly reduce crossover exposure of the emulsion layer unit 115 by the screen 202.

Following exposure to produce a stored latent image, the radiographic element 100 is removed from association with the intensifying screens 201 and 202 and processed in a rapid access processor—that is, a processor, such as an RP-X-Omat TM processor, which is capable of producing a image bearing radiographic element dry to the touch in less than 90 seconds. Rapid access processors are illustrated by Barnes et al U.S. Pat. No. 3,545,971 and Akio et al published European published patent application 248,390. Preferred rapid access processing is disclosed by Dickerson et al I and II, cited and incorporated by reference above. While most radiographic elements are intended for use with rapid access processing, for a few applications slower processing times are typical. For example, Taber processing of radiographic elements employed in mammography typically is extended for about 3 minutes.

While any radiographic element construction capable of providing the above characteristics is contemplated, the preferred radiographic elements of the present invention contain (1) substantially optimally spectrally sensitized tabular grain emulsions in the emulsion layer units to reduce crossover while achieving the high covering power and other known advantages of tabular grain emulsions, (2) one or more particulate dyes in the interlayer units to further reduce crossover to less than 10 percent without emulsion desensitization and minimal or no residual dye stain, and (3) hydrophilic colloid swell and coverage levels compatible with obtaining uniform coatings, rapid access processing, and reduced or eliminated wet pressure sensitivity. Specifically preferred radiographic elements containing features (1), (2) and (3) are those of Dickerson et al I and II, cited and incorporated by reference above.

When the assembly shown in FIG. 1 is to be exposed to X radiation, it is mounted in a cassette which serves as a mount to hold the assembly in position for exposure, as a light tight container to protect the radiographic element from unwanted exposure to external light, and as a convenient case for handling to protect the assembly as it is placed in position for exposure and later transported for processing.

Figure 2:
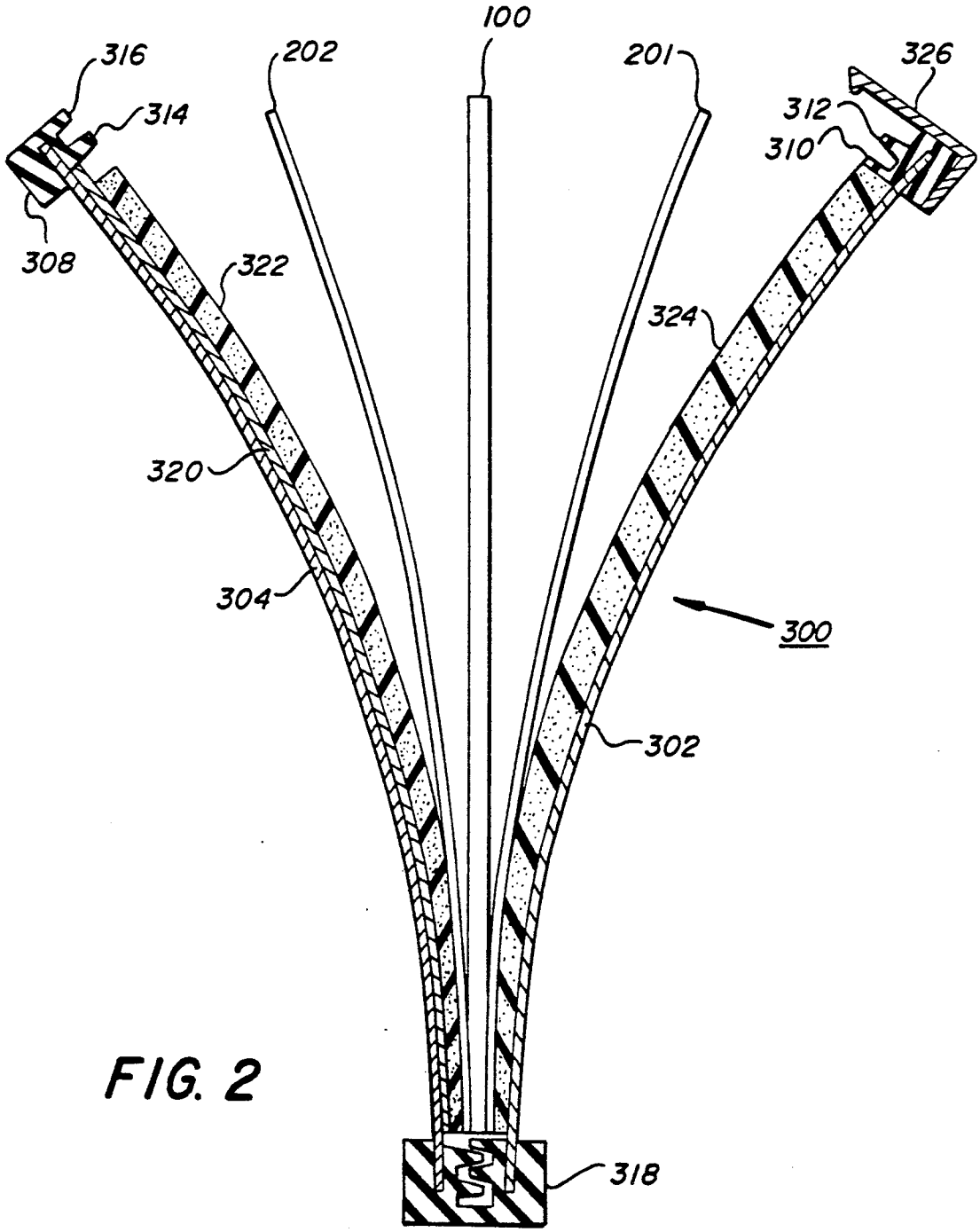
FIG. 2 is a sectional view of a partially open exposure package comprised of a double coated radiographic element, two intensifying screens and a cassette.

In FIG. 2 a partially opened cassette 300 is shown containing a sensitometrically asymmetric radiographic element 100 according to the invention and a pair of intensifying screens 201 and 202. The cassette 300 is shown fully closed, but with one corner broken away, in FIG. 3. The cassette is comprised of a tube side plate 302 constructed of a material readily penetrated by X radiation, such as aluminum, magnesium, hydrocarbon and similar low absorption polymers, or resin coated carbon fiber. A similarly constructed back plate 304 forms the back side of the cassette. Both plates are flexible with an arcuate set as shown.

The tube plate has a light lock 306 molded around its periphery, and the back plate has a similar light lock 308 molded around its periphery. The tube plate light lock has two ridges 310 and 312 that interleave with two ridges 314 and 316 of the back plate light lock when the cassette is closed. The tube and back plate light locks are integrally joined along one edge by a flexible portion 318 that functions as a hinge for opening and closing the cassette.

Each of the peripheral light locks define a seating area on the portion of the plate it surrounds. On the back plate seating area is provided a flexible absorption layer 320 for absorbing X radiation, such as a flexible lead foil. The function of the absorption layer is to minimize back scattering of X radiation passing through the assembly, since back scattering can detract from the desired uniformity of X radiation exposure. On the absorption layer is positioned a flexible compressible pad 322. A similar flexibly compressible pad 324 is located in the seating area defined by the light lock of the tube plate.

To close the cassette the tube and back plates are flexed to bring the light locks into the same interleaved relationship they occupy in FIG. 2 along the integral connecting portion 318. A flexible clip 326 attached to the tube plate light lock is constructed to slide over and catch on the back plate light lock when the cassette is fully closed. When the cassette is fully closed, the arcuate set in the tube and back plates together with the compressed flexible pads hold the intensifying screens firmly against the radiographic element, as is required for producing sharp images.

Because the assembly is sensitometrically asymmetric, attributable to the dissimilar sensitometric properties of the emulsion layer units on the opposite sides of the radiographic element and, in some but not all instances, the choice of differing front and back screens, one or more means are provided to ascertain that the assembly has been properly oriented in the cassette—i.e., to assure that the emulsion layer unit intended to be located nearest the source of X radiation in fact occupies that position.

Figure 3:
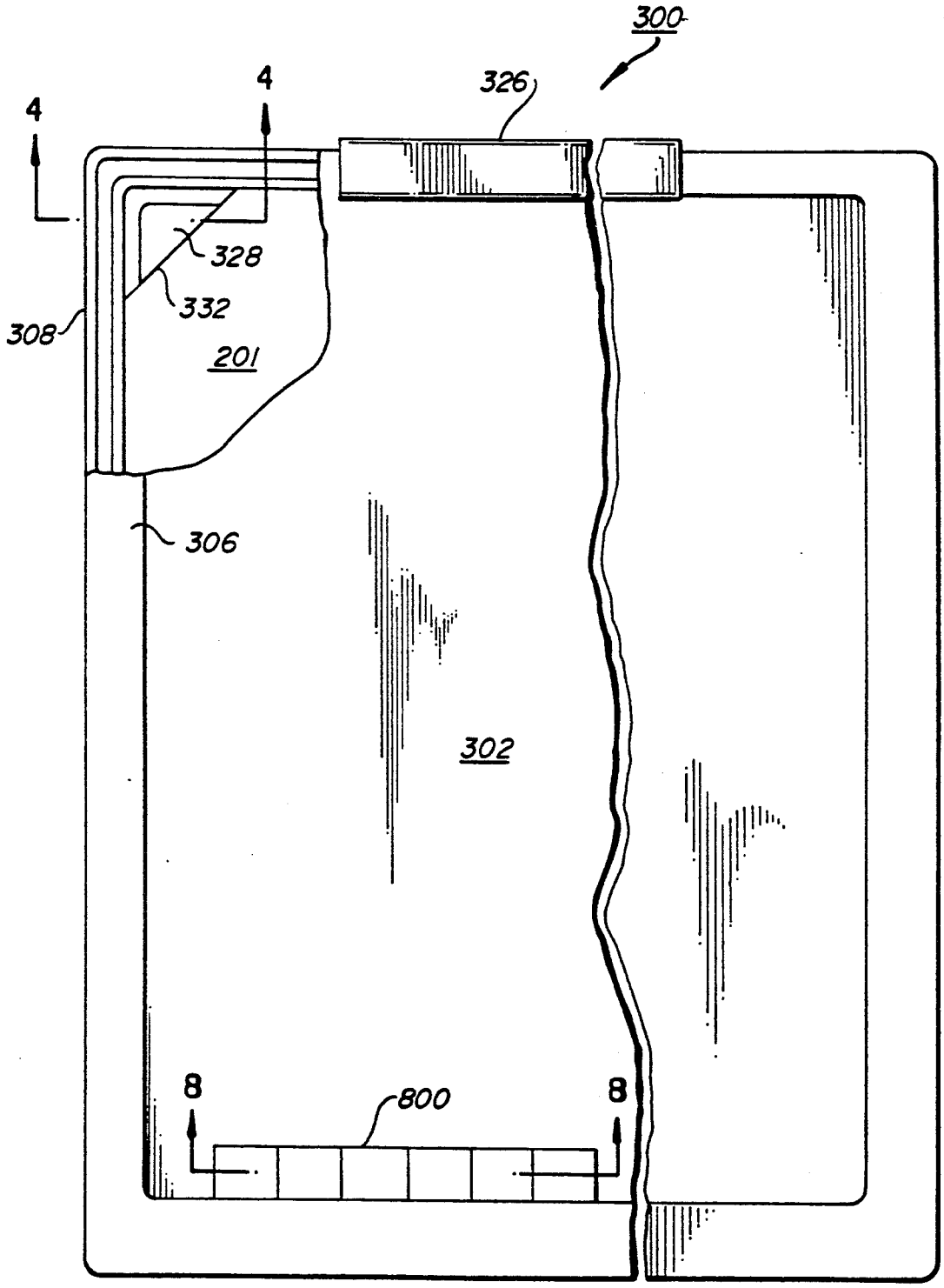
FIG. 3 is plan view of a cassette with a portion broken away to reveal an internal edge construction.
Figure 4:
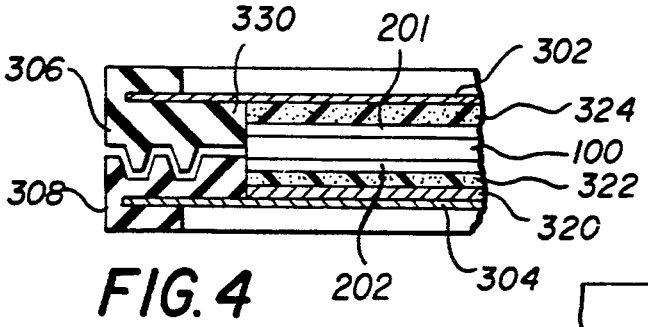
FIG. 4 is a sectional view taken along section line 4—4 in FIG. 3.

One preferred means for orienting the assembly within the cassette is shown in FIGS. 3 and 4. The tube plate and its associated light lock are broken away at the upper left hand corner of the cassette to reveal an extension 328 of the back plate light lock preempting a portion of the back plate seating area. Referring to FIG. 4, which additionally shows the tube plate and its light lock, extension 330 of the tube plate light lock similarly preempts a portion of the tube plate seating area. The extensions render both the back and tube plate seating areas geometrically unsymmetrical. As shown each are modified rectangular areas with an asymmetry imparting diagonal edge 332. In order to fit into the seating areas the radiographic element 100 and the screens 201 and 202 are correspondingly modified so that each exhibits a complementary diagonal edge. The diagonal edge asymmetery of the screens, radiographic element and seating areas allow only one orientation of the front screen 201 in the tube plate seating area, only one orientation of the back screen 202 in the back plate seating area and only one orientation of the radiographic element between the screens. If any one of the two screens and the radiographic element are inadvertently reversed in orientation while loading the cassette, a corner of the misaligned element overlaps the extensions 328 and 330 of the light locks interfering with closure of the cassette.

Figure 5:
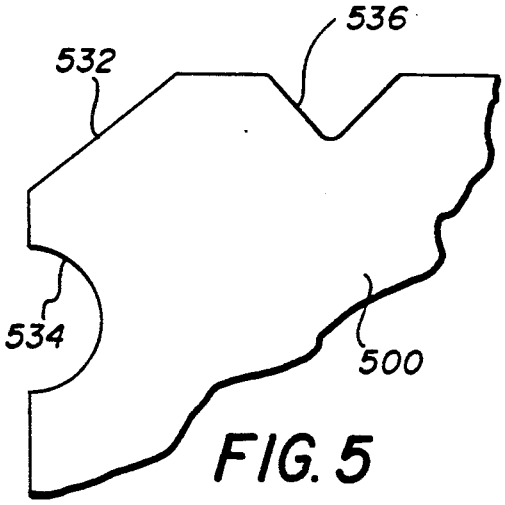
FIG. 5 is a detail of an assembly showing an alternative pattern of edge notching.

A diagonal edge is, of course, only one of a variety of geometrical configurations possible to impart asymmetry to the seating areas, screens and radiographic element. In FIG. 5 an assembly 500 is shown provided with, in addition to diagonal edge 532 that performs the function of diagonal edge 332 described above, two edge notches 534 and 536 differing in their geometrical form. Any one or combination of diagonal edge 532 and edge notches 534 and 536 cooperating with a complementary surface provided by the cassette is capable orienting the assembly within the cassette. It is apparent that different peripheral configurations of the sensitometrically asymmetric radiographic elements of the invention and the intensifying screens can be employed to assure that the desired element and screen combinations are loaded into a cassette, even when loading occurs in the dark.

Figure 6:
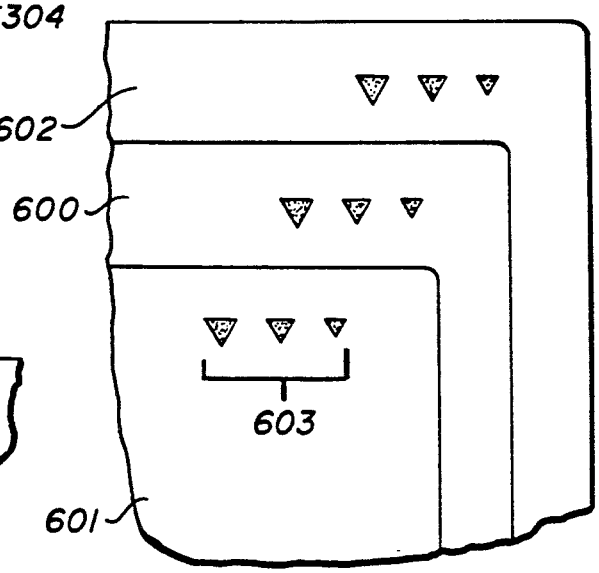
FIG. 6 is a detail of an assembly with the elements slightly laterally displaced to reveal a common safe light viewable pattern of marking.

Another approach for assuring proper orientation of intensifying screen and the sensitometrically asymmetric radiographic elements of the invention is illustrated in FIG. 6. As shown, the asymmetric radiographic element 600 and intensifying screens 601 and 602 are slightly laterally displaced from their final assembly relationship. In the displaced position an identical pattern 603 of marks is visible on each of the screens and the radiographic element. This pattern of marks provides a direct visual indication of proper relative orientation. The marks can be chosen to be visible under safe light conditions. Instead of having a pattern of marks, a single mark can be substituted. It is also possible to uniformly color one side of each of the screens and the radiographic element. Another technique is to construct the radiographic element and screens with a different safe light reflectivity (gloss) on their opposite surfaces. Operating in safe light an operature can visually ascertain the more reflective surface of each element in bringing the assembly together.

Figure 7:
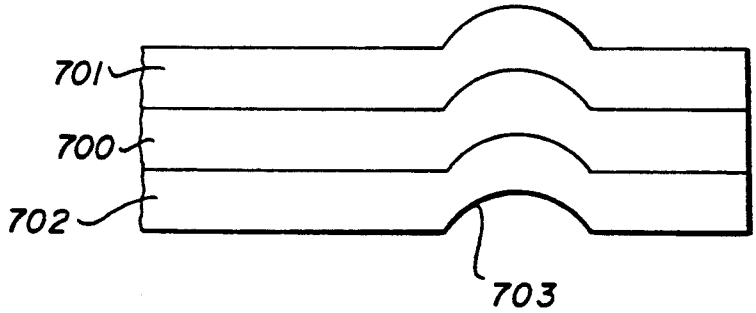
FIG. 7 is a schematic sectional edge view of an assembly showing a tactile marking scheme.

Referring to FIG. 7, a sensitometrically asymmetric radiographic element 700 according to the invention is shown mounted between intensifying screens 701 and 702. Each of the radiographic element and screens has a dimple (or similar deformation) 703 impressed in it adjacent one edge, preferably adjacent a corner. It is possible in the dark to feel the location of the dimple in each element and to bring the elements into the alignment shown.

In addition to or in place of locating a dimple in each element, it is possible to provide any one or all of the elements of the assembly with one side that feels rougher to the touch than another. This difference in surface texture can be felt in the dark or in safe light to assure proper relative orientation of the elements of the assembly. The non-emissive faces of the screens are preferably chosen for rougher texture, since no light scattering can be produced by surface roughness in these locations.

Figure 8:
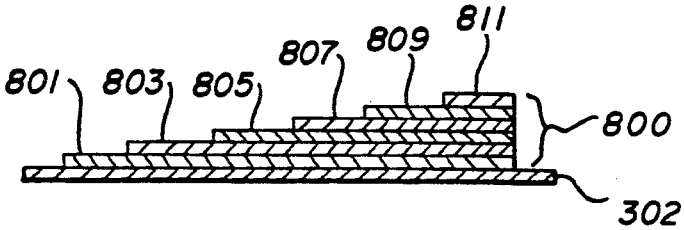
FIG. 8 is a section taken along section line 8—8 in FIG. 3.

Referring to FIGS. 3 and 8, another approach for ascertaining that the assembly was in fact exposed to X radiation with the screens and sensitometrically asymmetric radiographic element oriented as intended is to incorporate a test object, such as a step tablet, in the construction of the cassette. A step tablet 800 is shown consisting of a series of superimposed strips 801, 803, 805, 807, 809 and 811 differing in length. Viewed from left to right, X radiation must pass through from 1 to 6 strips. By forming the strips of a material that absorbs X radiation, such as lead, gadolinium oxide or a fluorocarbon polymer, a succession of image areas differing predictably in density are visible in the radiographic element following exposure and processing. By comparing the density steps to a reference density step profile any inadvertent reversal of one or more elements of the assembly prior to exposure is visually detectable. By integrating the density step record along one edge of the radiographic image the radiologist is apprized of the radiographic element and screen orientation for the image being read.

Figure 9:
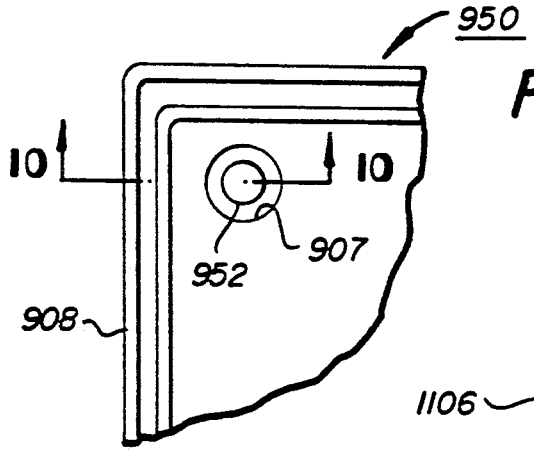
FIG. 9 is a corner detail of an alternative exposure package with the upper portion of the package removed.
Figure 10:
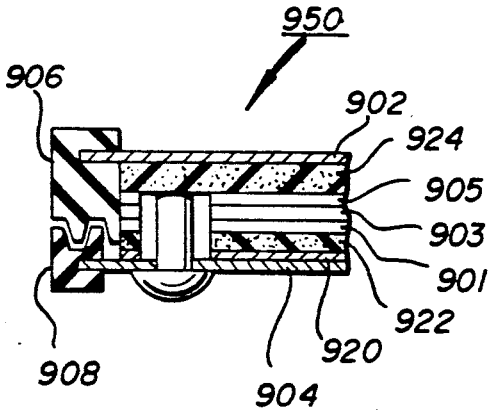
FIG. 10 is a section taken along section line 10—10 in FIG. 9.

Referring to FIGS. 9 and 10, still another arrangement is shown for insuring the desired orientation of an assembly satisfying the requirements of the invention within a cassette. An assembly 900 consisting of a back intensifying screen 901, a sensitometrically asymmetric radiographic element 903, and a front intensifying screen 905 is provided with an aperture 907 near one corner. The aperture renders each of the radiographic element and the screens geometrically unsymmetrical so that only one relative orientation is possible that results in an aperture extending through all elements of the assembly.

The assembly is shown in FIG. 10 mounted in a closed cassette 950 comprised of a tube plate 902, a back plate 904, light locks 906 and 908 peripherally surrounding the tube and back plates, respectively, an absorption layer 920, and a compressible pads 922 and 924. A pin 952 is mounted by the back plate extending through apertures in the back compressible pad and absorption layer and into the aperture 907 in the assembly. FIG. 9 shows the cassette as it appears when opened. The features of the cassette 950 not specifically described can be identical to those of cassette 300.

Only one orientation of the assembly 900 is possible that allows the pin 952 to enter the aperture 907. If the assembly is placed in the cassette in any other orientation, the pin engages the assembly interfering with closure of the cassette.

Figure 11:
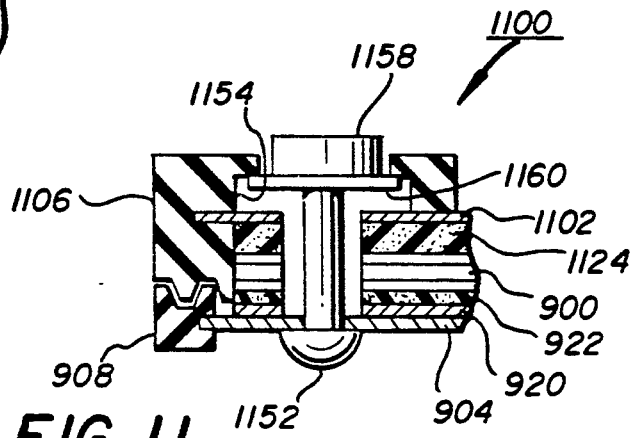
FIG. 11 is a section similar to FIG. 10 of another alternative exposure package.

In FIG. 11 an alternative construction is illustrated. The features of closed cassette 1100 not specifically described can be identical to those of cassette 300. The assembly 900, back plate 904, light lock 908, absorption layer 920 and compressible pad 922 are unchanged. The pin 1152 is somewhat longer than the pin 952, but otherwise identical. The tube plate 1102 and compressible pad 1124 differ from tube layer 902 and compressible pad 924 only by the inclusion of an aperture in alignment with the assembly aperture.

The tube plate light lock 1106 is modified as compared to tube plate light lock 906 to define a keeping chamber 1154 having an opening 1156. An indicator button 1158 on a keeper plate 1160 is loosely positioned in the keeping chamber. The indicator button is sized to be capable of protruding through the opening 1156, but the keeper plate is sized so that it is prevented from passing through the opening.

As shown in FIG. 11, with the assembly 900 oriented so that its aperture 907 is aligned with the corresponding apertures in the cassette elements, the pin pushes the keeper plate 1160 to its upper position in the keeping chamber 1154, causing the indicator button 1158 to protrude through the opening 1156. Thus, by sight or feel it can be ascertained that the assembly is properly aligned in the cassette. If, on the other hand, the assembly or any one element of the assembly is reversed in its orientation, the pin cannot reach the keeping chamber when an attempt is made to close the cassette. Even if the cassette could be forced shut with the assembly out of alignment, it is still apparent that the assembly is not properly oriented in the cassette, since the indicator button will not be positively held in position protruding through the opening in the keeping chamber.

If desired, the indicator button can be eliminated, leaving only the keeper plate. The difference is that safe light viewing rather than touch is then primarily relied upon to ascertain that the assembly is properly oriented in the cassette.

Figure 12:
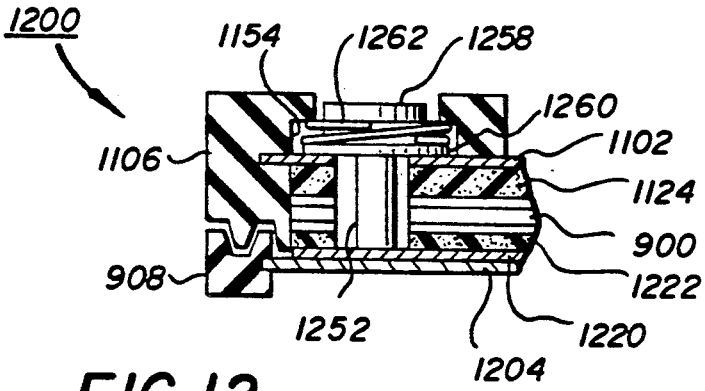
FIG. 12 is a section similar to FIG. 10 of an additional exposure package.

In FIG. 12 an additional construction is illustrated. The features of closed cassette 1200 not specifically described can be identical to those of cassette 300. The assembly 900, light locks 908 and 1106, compressible pad 922 and keeping chamber 1154 are unchanged. The back plate 1204 and absorption layer 1220 are like to corresponding elements in cassette 300.

The significant difference in the cassette 1200 is that the pin 1262 is attached to the keeper plate 1260 which is in turn connected to the indicator button 1258. A spring 1262 biases the keeper plate into engagement with the tube plate 1102.

When the cassette 1200 is closed as shown with the assembly 900 properly oriented, the indicator button lies remains within the keeper chamber. Any attempt to close the cassette with the assembly oriented in another manner results in pin 1252 engaging the assembly and raising the keeper plate 1260 from its spring biased location on the front tube. This in turn raises the indicator button 1258 and provides a positive tactile and visual indication of improper assembly orientation within the cassette.

The spring 1262 offers the advantage of allowing the relative position of the indicator button to determined in any orientation of the cassette. However, the arrangement is functional in the absence of the spring, since gravity can be relied upon to bias the pin to its lower position with the assembly is properly oriented.

In the foregoing illustrations sight and/or touch have been relied upon to determine proper assembly alignment. It also possible to construct the cassette to provide an electrical confirmation of proper assembly alignment.

Figure 13:
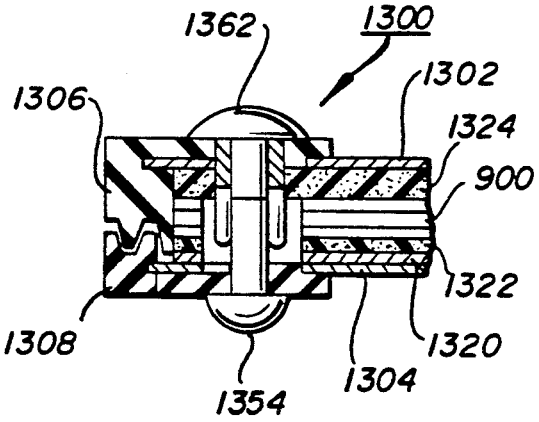
FIG. 13 is a section similar to FIG. 10 of still another exposure package.

Referring to FIG. 13 a cassette 1300 is shown comprised of a tube plate 1302, a back plate 1304, an absorption layer 1320, compressible pads 1322 and 1324, and an assembly 900 essentially similar to that described in connection with FIG. 11. The significant departure in the construction of the cassette 1300 is that the back plate light lock 1308 is extended inwardly to provide electrical isolation of the pin 1354 from the back plate and absorption layer. Similarly the tube plate light lock 1306 is extended inwardly to provide electrical isolation of a cooperating expansible female pin 1362 from the tube plate.

when the cassette 1300 is closed with the assembly 900 properly oriented the pins 1354 and 1362 are mated to provide an electrical conduction path. Thus, in use, after loading the cassette as shown, placing the pins in an electrical circuit in series with a current limiting resistance and an ammeter, provides a positive indication of assembly alignment. Little or not current through the ammeter indicates an obstruction between the pins and improper assembly alignment.

Although only one of the various constructions described above are required to ascertain assembly alignment, it is recognized that the presence of one construction for assuring alignment is not incompatible with the presence of one or more other constructions. Thus, multiple means can be provided for ascertaining assembly orientation for exposure. It is preferred to provide both a safe light visible and tactile indicators of assembly orientation. The electrical indicator is particularly suitable for mechanical loading and manipulation of the cassette.

It is appreciated that the various features of the cassette are intended as exemplary only and can be modified without departing from the practice of the invention. Specifically, any one of the alternative cassette constructions of Tone et al U.S. Pat. Nos. 3,466,440, 3,488,753 and 3,504,180, Zechmair et al U.S. Pat. No. 3,958,125, Nieuweboer U.S. Pat. No. 3,081,686 and Bauer U.S. Pat. Nos. 4,339,038 and 4,350,248, cited above, and here incorporated by reference, can be readily modified to incorporate any one or combination of the various features specifically described for assuring proper orientation of the assembly within the exposure package. For example, a true hinge rather than the flexible linkage 318 can be employed for joining the tube and back plates of the cassette. The tube and back plates need not be flexible or arcuate. Neither is it required that compressible pads be employed to hold the elements of the assembly together. For example, a conventional alternative construction is to place a magnetic plate in one seating area and a ferric plate in the other seating area. When the tube and back plates are then brought together the assembly elements are pressed together by the magnetic attraction of the ferric and magnetic plates. The light locks need not be formed of a molded plastic as shown. They can alternatively be metal elements. The catch 326 can be replaced by any convenient conventional closure element.

The projections 328 and 330 need not be integral inward extensions of the light locks. They can be separate elements. Additionally, it is possible to realize the advantages of this invention with only one of the two projections present, even when no other means for avoiding assembly reversal is provided. The various pin constructions are noted to make use of elements that are integral with the light locks. Separate elements rather than extensions of the light locks can be provided, if desired. The pins need not positioned near a corner of the cassette. Any location that imparts asymmetry can be employed.

The various arrangements for ascertaining desired orientation of the radiographic elements and screens during exposure to X radiation are, of course, only illustrative. Variations on these arrangements will be readily apparent to those skilled in the art having access to this disclosure.

EXAMPLES

The invention can be better appreciated by reference to the following specific examples:

Screens

The following intensifying screens were employed:

Screen X

This screen has a composition and structure corresponding to that of a commercial, general purpose screen. It consists of a terbium activated gadolinium oxysulfide phosphor having a median particle size of 7 μm coated on a white pigmented polyester support in a Permuthane TM polyurethane binder at a total phosphor coverage of 7.0 g/dm$^2$ at a phosphor to binder ratio of 15:1.

Screen Y

This screen has a composition and structure corresponding to that of a commercial, medium resolution screen. It consists of a terbium activated gadolinium oxysulfide phosphor having a median particle size of 7 μm coated on a white pigmented polyester support in a Permuthane TM polyurethane binder at a total phosphor coverage of 5.9 g/dm$^2$ at a phosphor to binder ratio of 15:1 and containing 0.017535% by weight of a 100:1 weight ratio of a yellow dye and carbon.

Screen Z

This screen has a composition and structure corresponding to that of a commercial, high resolution screen. It consists of a terbium activated gadolinium oxysulfide phosphor having a median particle size of 5 μm coated on a blue tinted clear polyester support in a Permuthane TM polyurethane binder at a total phosphor coverage of 3.8 g/dm$^2$ at a phosphor to binder ratio of 21:1 and containing 0.0015% carbon.

Radiographic Exposures

Assemblies consisting of a double coated radiographic element sandwiched between a pair of intensifying screens were in each instance exposed as follows:

The assemblies were exposed to 70 KVp X-radiation, varying either current (mA) or time, using a 3-phase Picker Medical (Model VTX650) TM X-ray unit containing filtration up to 3 mm of aluminum. Sensitometric gradations in exposure were achieved by using a 21-increment (0.1 log E) aluminum step wedge of varying thickness.

Element A (example)

(Em.S)LXOA(Em.F)

Radiographic element A was a double coated radiographic element exhibiting near zero crossover.

Radiographic element A was constructed of a blue-tinted polyester support. On each side the support a crossover reducing layer consisting of gelatin (1.6 g/m$^2$) containing 320 mg/m$^2$ of a 1:1 weight ratio mixture of the microcrystalline arylidene dyes Dyes 56 and 59 of Dickerson et al II, U.S. Pat. No. 4,900,652.

Fast (F) and slow (S) emulsion layers were coated on opposite sides of the support over the crossover reducing layers. Both emulsions were green-sensitized high aspect ratio tabular grain silver bromide emulsions, where the term "high aspect ratio" is employed as defined by Abbott et al U.S. Pat. No. 4,425,425 to require that at least 50 percent of the total grain projected area be accounted for by tabular grains having a thickness of less than 0.3 μm and having an average aspect ratio of greater than 8:1. The first emulsion exhibited an average grain diameter of 3.0 μm and an average grain thickness of 0.13 μm. The second emulsion exhibited an average grain diameter of 1.2 μm and an average grain thickness of 0.13 μm. Each emulsion was spectrally sensitized with 400 mg/Ag mol of anhydro-5,5-dichloro-9-ethyl-3,3'-bis(3-sulfopropyl)oxacarbocyanine hydroxide, followed by 300 mg/Ag mol of potassium iodide. The emulsion layers were each coated with a silver coverage of 2.42 g/m$^2$ and a gelatin coverage of 2.85 g/m$^2$. Protective gelatin layers (0.69 g/m$^2$) were coated over the emulsion layers. Each of the gelatin containing layers were hardened with bis(vinylsulfonylmethyl) ether at 1% of the total gelatin.

When coated as described above, but symmetrically, with Emulsion F coated on both sides of the support and Emulsion S omitted, using a Screen X pair, Emulsion F exhibited a relative log speed of 144. Similarly, Emulsion S when coated symmetrically with Emulsion F omitted exhibited a relative log speed of 68. The emulsions thus differed in speed by a relative log speed of 76 (or 0.76 log E, where E represents exposure in meter-candle-seconds). A relative log speed difference of 30 renders one emulsion twice as fast as the other. All speeds in the examples are referenced to 1.0 above Dmin.

When Element A was tested for crossover as described by Abbott et al U.S. Pat. No. 4,424,425, it exhibited a crossover of 2%.

Element B (control)

(Em.L)LXOB(Em.L)

Radiographic element B was a conventional double coated radiographic element exhibiting extended exposure latitude.

Radiographic element B was a conventional double coated radiographic element exhibiting extended exposure latitude.

Radiographic element B was constructed of a blue-tinted polyester support. Identical emulsion layers (L)

were coated on opposite sides of the support. The emulsion employed was a green-sensitized polydispersed silver bromoiodide emulsion. The same spectral sensitizing dye was employed as in Element A, but only 42 mg/Ag mole was required, since the emulsion was not a high aspect ratio tabular grain emulsion and therefore required much less dye for substantially optimum sensitization. Each emulsion layer was coated to provide a silver coverage of 2.62 g/m$^2$ and a gelatin coverage of 2.85 g/m$^2$. Protective gelatin layers (0.70 g/m$^2$) were coated over the emulsion layers. Each of the layers were hardened with bis(vinylsulfonylmethyl) ether at 0.5% of the total gelatin.

When coated as described above, using a Screen X pair, the film exhibited a relative log E speed of 80 and a contrast of 1.6.

When Element B was tested for crossover as described by Abbott et al U.S. Pat. No. 4,425,425, it exhibited a crossover of 25%.

Element C (example)

(Em.FLC)LXOE(Em.SHC)

Radiographic element C was a double coated radiographic element exhibiting near zero crossover.

Radiographic element C was constructed of a low crossover support composite (LXO) identical to that of element A, described above.

Fast low contrast (FLC) and slow high contrast (SHC) emulsion layers were coated on opposite sides of the support over the crossover reducing layers. Both emulsions were green-sensitized high aspect ratio tabular grain silver bromide emulsions sensitized and coated similarly as the emulsion layers of element A.

When coated symmetrically, with Emulsion FLC coated on both sides of the support and Emulsion SHC omitted, using a Screen X pair, Emulsion FLC exhibited a relative log speed of 113 and an average contrast of 1.98. Similarly, Emulsion SHC when coated symmetrically with Emulsion FLC omitted exhibited a relative log speed of 69 and an average contrast of 2.61. The emulsions thus differed in average contrast by 0.63 while differing in speed by 44 relative log speed units (or 0.44 log E).

When Element C was tested for crossover as described by Abbott et al U.S. Pat. No. 4,425,426, it exhibited a crossover of 2%.

Element D (example)

(Em.LC)LXOD(Em.HC)

Radiographic element D was a double coated radiographic element exhibiting near zero crossover.

Radiographic element D was constructed of a low crossover support composite (LXO) identical to that of element A, described above.

Low contrast (LC) and high contrast (HC) emulsion layers were coated on opposite sides of the support over the crossover reducing layers. Both emulsions were green-sensitized high aspect ratio tabular grain silver bromide emulsions, where the term "high aspect ratio" is employed as defined by Abbott et al U.S. Pat. No. 4,425,425 to require that at least 50 percent of the total grain projected area be accounted for by tabular grains having a thickness of less than 0.3 μm and having an average aspect ratio of greater than 8:1. The low contrast emulsion was a 1.1 (silver ratio) blend of a first emulsion which exhibited an average grain diameter of 3.0 μm and an average grain thickness of 0.13 μm and a second emulsion which exhibited an average grain diameter of 1.2 μm and an average grain thickness of 0.13 μm. The high contrast emulsion exhibited an average grain diameter of 1.7 μm and an average grain thickness of 0.13 μm. The high contrast emulsion exhibited less polydispersity than the low contrast emulsion. Both the high and low contrast emulsions were spectrally sensitized with 400 mg/Ag mol of anhydro-5,5-dichloro-9-ethyl-3,3'-bis(3-sulfopropyl)oxacarbocyanine hydroxide, followed by 300 mg/Ag mol of potassium iodide. The emulsion layers were each coated with a silver coverage of 2.42 g/m$^2$ and a gelatin coverage of 3.22 g/m$^2$. Protective gelatin layers (0.69 g/m$^2$) were coated over the emulsion layers. Each of the gelatin containing layers were hardened with bis(vinylsulfonylmethyl) ether at 1% of the total gelatin.

When coated as described above, but symmetrically, with Emulsion LC coated on both sides of the support and Emulsion HC omitted, using a Screen X pair, Emulsion LC exhibited a relative log speed of 98 and an average contrast of 1.8. Similarly, Emulsion HC when coated symmetrically with Emulsion LC omitted exhibited a relative log speed of 85 and an average contrast of 3.0. The emulsions thus differed in average contrast by 1.2 while differing in speed by 13 relative log speed units (or 0.13 log E).

When Element D was tested for crossover as described by Abbott et al U.S. Pat. No. 4,425,425, it exhibited a crossover of 2%.

Element E (control)

(Em.MC)HXOE(Em.MC)

Radiographic element E was a conventional double coated radiographic element of a type employed on occasion for chest cavity examinations.

Radiographic element E was constructed like radiographic element B, except that medium contrast emulsion layers (MC) were employed and the silver coverage of each emulsion layer was reduced to 1.93 g/m$^2$.

When coated as described above, using a Screen X pair, the film exhibited a relative log E speed of 80 and an average contrast of 2.6.

When Element E was tested for crossover as described by Abbott et al., U.S. Pat. No. 4,425,425, it exhibited a crossover of 30%.

Element F (control)

(Em.HC)HXOF(Em.HC)

Radiographic element F was a conventional high aspect ratio tabular grain double coated radiographic element of a type employed on occasion for chest examinations of subjects having low chest densities—i.e., children or adults of slight build.

Radiographic element F was constructed like radiographic element D, except that no crossover reducing layers were coated on the film support and a high contrast emulsion (HC) similar to that employed in radiographic element D was coated on both sides of the support.

When coated as described above, using a Screen X pair, the film exhibited a relative log E speed of 80 and an average contrast of 2.9.

When Element F was tested for crossover as described by Abbott et al U.S. Pat. No. 4,425,425, it exhibit a crossover of 20%.

Processing

The films were processed in a commercially available Kodak RP X-Omat (Model 6B) TM rapid access processor in 90 seconds as follows:

| | |
|---|---|
| development | 24 seconds at 35° C., |
| fixing | 20 seconds at 35° C., |
| washing | 10 seconds at 35° C., and |
| drying | 20 seconds at 65° C., |

where the remaining time is taken up in transport between processing steps. The development step employs the following developer:

| | |
|---|---|
| Hydroquinone | 30 g |
| 1-Phenyl-3-pyrazolidone | 1.5 g |
| KOH | 21 g |
| $NaHCO_3$ | 7.5 g |
| $K_2SO_3$ | 44.2 g |
| $Na_2S_2O_5$ | 12.6 g |
| NaBr | 35 g |
| 5-Methylbenzotriazole | 0.06 g |
| Glutaraldehyde | 4.9 g |
| Water to 1 liter at pH 10.0, and | |

the fixing step employs the following fixing composition:

| | |
|---|---|
| Ammonium thiosulfate, 60% | 260.0 g |
| Sodium bisulfite | 180.0 g |
| Boric acid | 25.0 g |
| Acetic acid | 10.0 g |
| Aluminum sulfate | 8.0 g |
| Water to 1 liter at pH 3.9 to | 4.5. |

Sensitometry

Optical densities are expressed in terms of diffuse density as measured by an X-rite Model 310 TM densitometer, which was calibrated to ANSI standard PH 2.19 and was traceable to a National Bureau of Standards calibration step tablet. The characteristic curve (density vs. log E) was plotted for each radiographic element processed. The average gradient, presented in Table I below under the heading Contrast, was determined from the characteristic curve at densities of 0.25 and 2.0 above minimum density.

TABLE I

| Assemblies | | | | |
|---|---|---|---|---|
| Assembly | Front Sc. | Film | Back Sc. | Contrast |
| I | X | (Em.S)LXOA(Em.F) | Z | 2.9 |
| II | Z | (Em.F)LXOA(Em.S) | X | 2.5 |
| III | Y | (Em.S)LXOA(Em.F) | Y | 2.0 |
| IV | X | (Em.L)HXOB(Em.L) | Z | 1.6 |

TABLE I-continued

| Assemblies | | | | |
|---|---|---|---|---|
| Assembly | Front Sc. | Film | Back Sc. | Contrast |
| V | Z | (Em.L)HXOB(Em.L) | X | 1.6 |
| VI | Y | (Em.L)HXOB(Em.L) | Y | 1.6 |
| VII | Z | (Em.FLC)LXOC(Em.SHC) | X | 2.5 |
| VIII | Z | (Em.SHC)LXOC(Em.FLC) | X | 1.5 |

From Table I it is apparent that assemblies I and II are in fact the same assembly, which was simply reversed in its orientation during exposure. Similarly, assemblies IV and V are the same assembly simply reversed in orientation during exposure. The radiographic film, Element A, satisfying the requirements of the invention by exhibiting a crossover of less than 10% and a greater than 2X difference in emulsion speeds showed a contrast in Assembly I 0.4 greater than in Assembly II. On the other hand, the control radiographic element B, which exhibited a higher crossover and identical emulsion layer units on opposite sides of the support, showed no variation in contrast between Assemblies IV and V.

When an entirely different pair of screens, a Screen Y pair, were substituted for the X and Z screen pair, radiographic element A exhibited still a third average contrast, while control radiographic element B still exhibited the same average contrast.

Assemblies VII and VIII in Table I were constructed to demonstrate that further advantages that can be realized by combining differences in speed and contrast between the emulsion layer units on opposite sides of the support in a low crossover radiographic element. Referring to Table I, it is apparent that highly dissimilar average densities are obtained, depending on orientation of the Film C between the same pair of screens, X and Z. If such large differences in contrast can be realized merely by reversing the orientation of the film, it is clear that still other contrasts can be obtained by also changing the selection of screens employed in combination with Film C.

The following comparisons were provided to demonstrate the greater exposure latitudes attainable by employing low crossover radiographic elements with the emulsion layer units on the opposite sides of the support differing in contrast. The comparisons are summarized in Table II.

TABLE II

| Screen/Film Assembly | | Contrast | | | |
|---|---|---|---|---|---|
| | | Average | Lung | Heart | |
| IX. | Z(Em. LC)LXOD(Em. HC)X | 1.5 | 100 | 100 | (Example) |
| V. | Z(Em. L)HXOB(Em. L)X | 1.6 | 100 | 60 | (Control) |
| IV. | X(Em. L)HXOB(Em. L)Z | 1.6 | 100 | 60 | (Control) |
| X. | X(Em. L)HXOB(Em. L)X | 1.6 | 100 | 60 | (Control) |
| XI. | Z(Em. MC)HXOE(Em. MC)Z | 2.6 | 115 | 20 | (Control) |
| XII. | Z(Em. HC)HXOF(Em. HC)Z | 2.9 | 130 | 20 | (Control) |
| VII. | Z(Em. FLC)LXOC(Em. SHC)X | 2.5 | 115 | 40 | (Example) |
| VIII. | Z(Em. SHC)LXOC(Em. FLC)X | 1.5 | 69 | 266 | (Example) |

From Table II it is apparent that assemblies IX, V, IV and X all produced similar average contrasts when exposed between pair of intensifying screens. The relative lung contrast, reported as 100, was selected as the contrast corresponding to a density of 1.8, which is a commonly accepted density for reading lung features in a radiograph. Relative heart contrast was then fixed as the contrast corresponding to a 1.0 log E lower exposure level, reflecting the fact that the heart normally absorbs about 10 times the X-radiation absorbed by the lungs and therefore allows only about one tenth of the X-radiation to reach the radiographic element in the heart image area that reaches the radiographic element in the lung image areas. While Assembly IX exhibited a lower contrast in its heart image areas than in its lung image areas, the heart image are for Assembly IX was assigned a relative contrast of 100 for the purpose of comparing contrasts in the heart image areas of the various assemblies. In comparing the relative heart area contrasts of Assemblies V, IV and X with that of Assembly IX, it was observed that these later assemblies provided only 60 percent of the contrast made available by Assembly I. The heart area contrasts were sufficiently low in the control assemblies as to require skilled observation to distinguish significant image features, whereas the much larger heart region relative contrasts provided by Assembly IX containing the double coated radiographic element of the invention were clearly discernible with much less visual effort. Assemblies V, IV and X demonstrate that screen manipulation was ineffective in influencing the contrasts observed using the conventional extended latitude radiographic element.

Assemblies XI and XII were included in Table II to demonstrate the clearly inferior image contrast observed in heart areas using conventional radiographic films of types sometimes used for chest cavity examinations, but not specifically designed for this use. With a relative contrast of only 20 in heart areas, radiographic elements E and F clearly have limited utility in chest cavity examinations of heart areas.

Referring to Table II, it is apparent that orienting the Film C with the fast low contrast emulsion layer adjacent the front screen Z produced results comparable to that obtained control Film E, except that a very advantageous doubling of relative contrast in the heart region was observed. When the Film C was reversed, contrast in the lung areas was reduced somewhat, but remained well within the range of obtaining useful information from lung image areas. At the same time relative contrast in the heart region was increased to 266. Thus, this combination appears superior to all others in Table II for obtaining image information from heart areas.

The foregoing comparisons provide a striking demonstration of the advantages which a radiologist can realize from the present invention. The present invention offers the radiologist a variety of image contrasts using only a single type of radiographic element.

The invention has been described in detail with particular reference to preferred embodiments thereof, but it will be understood that variations and modifications can be effected within the spirit and scope of the invention.

What is claimed is:

1. A radiographic element comprised of a transparent film support, first and second silver halide emulsion layer units coated on opposite sides of the film support, and means for reducing to less than 10 percent crossover of electromagnetic radiation of wavelengths longer than 300 nm capable of forming a latent image in the silver halide emulsion layer units, said crossover reducing means being decolorized in less than 90 seconds during processing of said emulsion layer units, characterized in that said first and second silver halide emulsion layer units exhibit significantly different sensitometric characteristics and means are provided for ascertaining which of said first and second emulsion layer units are positioned nearest a source of X-radiation during exposure.

2. A radiographic element according to claim 1 further characterized in that said first silver halide emulsion layer unit exhibits a speed at 1.0 above minimum density which is at least twice that of the second silver halide emulsion layer unit, the speed of the first silver halide emulsion layer unit being determined with the first silver halide emulsion unit replacing the second silver halide emulsion unit to provide an arrangement with the first silver halide emulsion unit present on both sides of the transparent support and the speed of the second silver halide emulsion layer unit being determined with the second silver halide emulsion unit replacing the first silver halide emulsion unit to provide an arrangement with the second silver halide emulsion unit present on both sides of the transparent support.

3. A radiographic element according to claim 2 further characterized in that the first silver halide emulsion layer unit is from 2 to 10 times faster than the second silver halide emulsion layer unit.

4. A radiographic element according to claim 3 further characterized in that the first silver halide emulsion layer unit is from 2 to 4 times faster than the second silver halide emulsion layer unit.

5. A radiographic element according to claim 1 further characterized in that said first silver halide emulsion layer unit exhibits an average contrast of less than 2.0, based on density measurements at 0.25 and 2.0 above minimum density and said second silver halide emulsion layer unit exhibits an average contrast of at least 2.5, based on density measurements at 0.25 and 2.0 above minimum density, the contrast of the first silver halide emulsion layer unit being determined with the first silver halide emulsion unit replacing the second silver halide emulsion unit to provide an arrangement with the first silver halide emulsion unit present on both sides of the transparent support and the contrast of the second silver halide emulsion layer unit being determined with the second silver halide emulsion unit replacing the first silver halide emulsion unit to provide an arrangement with the second silver halide emulsion layer unit present on both sides of the transparent support.

6. A radiographic element according to claim 5 further characterized in that the first silver halide emulsion layer unit exhibits an average contrast that differs by 0.5 to 3.5 from that of the second silver halide emulsion layer unit.

7. A radiographic element according to claim 6 further characterized in that the first silver halide emulsion layer unit exhibits an average contrast that differs by 1.0 to 2.5 from that of the second silver halide emulsion layer unit.

8. A radiographic element according to claim 1 further characterized in that the crossover reducing means decreases crossover to less than 5 percent.

9. A radiographic element according to claim 8 further characterized in that the crossover reducing means decreases crossover to less than 3 percent.

10. A radiographic element according to claim 1 further characterized in that the crossover reducing means is comprised of a hydrophilic colloid layer interposed between at least one of said silver halide emulsion layer units and said support containing a dye capable of absorbing electromagnetic radiation to which said silver halide emulsion layer unit on the opposite side of the support is responsive.

11. A radiographic element according to claim 10 further characterized in that the dye in said interposed layer is, prior to processing, in the form of particles and is capable of being decolorized during processing.

12. A radiographic element according to claim 1 further characterized in said silver halide emulsion layer unites are comprised of emulsions in which tabular silver halide grains having a thickness of less than 0.3 μm exhibit an average aspect ratio of greater than 5:1 and account for greater than 50 percent of the total grain projected area.

13. A radiographic element according to claim 12 further characterized in that said silver halide emulsion layer units are spectrally sensitized to at least 60 percent of their highest attainable sensitivities.

14. A radiographic element according to claim 13 further characterized in said silver halide emulsion layer units are comprised of emulsions in which tabular silver halide grains having a thickness of less than 0.2 μm exhibit an average aspect ratio of greater than 8:1 and account for greater than 70 percent of the total grain projected area.

15. A radiographic element according to claim 1 further characterized in that said emulsion layer units and crossover reducing means are each comprised of processing solution permeable hardenable hydrophilic colloid layers, said crossover reducing means includes a hydrophilic colloid layer interposed between one of said emulsion layer units and said support containing a particulate dye capable of absorbing radiation to which said emulsion layer unit coated on the opposite side of the support is responsive and at least 10 $mg/dm^2$ of said hardenable hydrophilic colloid, said emulsion layer units contain a combined silver coating coverage sufficient to produce a maximum density on processing the range of from 3 to 4, a total of from 35 to 65 $mg/dm^2$ of processing solution permeable hardenable hydrophilic colloid is coated on each of said opposed major surfaces of said support, and said processing solution permeable hydrophilic colloid layers are forehardened in an amount sufficient to reduce swelling of said layers to less than 300 percent, percent swelling being determined by (a) incubating said radiographic element at 38° C. for 3 days at 50 percent relative humidity, (b) measuring layer thickness, (c) immersing said radiographic element in distilled water at 21° C. for 3 minutes, and (d) determining the percent change in layer thickness as compared to the layer thickness measured in step (b), whereby said radiographic element exhibits high covering power, reduced crossover without emulsion desensitization, reduced wet pressure sensitivity, and can be developed, fixed, washed, and emerge dry to the touch in a 90 second 35° C. process cycle consisting of

| | |
|---|---|
| development | 24 seconds at 40° C., |
| fixing | 20 seconds at 40° C., |
| washing | 10 seconds at 40° C., and |
| drying | 20 seconds at 65° C., |

where the remaining time is transport between processing steps, the development step employs the following developer:

| | |
|---|---|
| Hydroquinone | 30 g |
| 1-Phenyl-3-pyrazolidone | 1.5 g |
| KOH | 21 g |
| $NaHCO_3$ | 7.5 g |
| $K_2SO_3$ | 44.2 g |
| $Na_2S_2O_5$ | 12.6 g |
| NaBr | 35 g |
| 5-Methylbenzotriazole | 0.06 g |
| Glutaraldehyde | 4.9 g |
| Water to 1 liter at pH 10.0, and | |

the fixing step employs the following fixing composition:

| | |
|---|---|
| Ammonium thiosulfate, 60% | 260.0 g |
| Sodium bisulfite | 180.0 g |
| Boric acid | 25.0 g |
| Acetic acid | 10.0 g |
| Aluminum sulfate | 8.0 g |
| Water to 1 liter at pH 3.9 to | 4.5. |

16. A radiographic element according to claim 1 further characterized in that said means for ascertaining which of said first and second emulsion layer units are positioned nearest a source of X-radiation during exposure is comprised of a mark capable of being seen under safe-light conditions.

17. A radiographic element according to claim 1 further characterized in that said means for ascertaining which of said first and second emulsion layer units are positioned nearest a source of X-radiation during exposure is comprised of means for permitting tactile discrimination between said first and second emulsion layer units.

18. A radiographic element according to claim 17 further characterized in that said means for permitting tacile discrimination is a boundary rendering said support asymmetrical.

19. A radiographic element according to claim 18 further characterized in that said support is rendered asymmetrical by an aperture or edge notch.

20. An imaging assembly comprised of a radiographic element and a front and back pair of intensifying screens characterized in that said radiographic element is that recited in any one of claims 1 to 19 inclusive.

21. An imaging assembly according to claim 20 further characterized in that at least one of said front and back intensifying screens includes means for referencing its orientation to that of said radiographic element.

22. An imaging assembly according to claim 21 further characterized in that said orientation referencing means is comprised of a visual indicator capable of being seen under safe-light conditions.

23. An imaging assembly according to claim 21 further characterized in that said radiographic element and said front and back intensifying screens each include means for permitting tactile identification of their orientation.

24. An imaging assembly according to claim 23 further characterized in that said means for permitting tactile identification of the orientation of said radiographic elements and said first and second screens is comprised of a boundary rendering each of said radiographic element and said first and second screens asymmetrical.

25. An imaging assembly according to claim 24 further characterized in that said radiographic element and said front and back screens are each rendered asymmetrical by an aperture or edge notch.

26. An exposure package comprised of an assembly and means forming a cassette housing for said assembly, characterized in that said assembly is constructed according to claim 20.

27. An exposure package according to claim 26 further characterized in that said assembly includes at least one boundary for imparting asymmetry and said cassette housing includes means for limiting said asymmetry imparting boundary to a single orientation.

28. An exposure package according to claim 27 further characterized in that said cassette housing includes means peripherally defining a seating area for said assembly and means for rendering said seating area asymmetrical.

29. An exposure package according to claim 28 further characterized in that said means for rendering said seating area asymmetrical includes a pin.

30. An exposure package according to claim 28 further characterized in that said means for rendering said seating area asymmetrical includes an edge for cooperating with an asymmetrical edge of said assembly.

31. An exposure package according to claim 26 further characterized in that an exposure step tablet is located on said cassette housing.

* * * * *